United States Patent
Fröberg Olsson et al.

(10) Patent No.: US 10,149,306 B2
(45) Date of Patent: Dec. 4, 2018

(54) METHODS AND APPARATUS FOR PRECODING CONTROL IN A WIRELESS COMMUNICATION NETWORK

(71) Applicant: Telefonaktiebolaget LM Ericsson (publ), Stockholm (SE)

(72) Inventors: Jonas Fröberg Olsson, Ljungsbro (SE); Mirsad Cirkic, Linköping (SE); Martin Hessler, Linköping (SE); Kristina Hessler, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/545,333

(22) PCT Filed: Apr. 7, 2017

(86) PCT No.: PCT/SE2017/050346
§ 371 (c)(1),
(2) Date: Jul. 21, 2017

(65) Prior Publication Data

US 2018/0295631 A1    Oct. 11, 2018

(51) Int. Cl.
*H04B 7/02* (2018.01)
*H04W 72/08* (2009.01)
*H04W 72/04* (2009.01)
*H04B 7/06* (2006.01)

(52) U.S. Cl.
CPC ........ *H04W 72/082* (2013.01); *H04B 7/0626* (2013.01); *H04B 7/0632* (2013.01); *H04B 7/0634* (2013.01); *H04W 72/0446* (2013.01); *H04W 72/0466* (2013.01)

(58) Field of Classification Search
CPC ........... H04W 72/082; H04W 72/0466; H04W 72/0446; H04B 7/0626; H04B 7/0634
USPC ....... 375/260, 262, 265, 267, 295, 296, 316; 370/203, 204, 208, 209
See application file for complete search history.

(56) References Cited

U.S. PATENT DOCUMENTS

| 2011/0249637 | A1 | 10/2011 | Hammarwall et al. |
| 2012/0020433 | A1* | 1/2012 | Bhattad ............... H04B 7/0417 375/296 |
| 2013/0016764 | A1 | 1/2013 | Kim et al. |
| 2014/0064393 | A1 | 3/2014 | Sun et al. |

(Continued)

FOREIGN PATENT DOCUMENTS

| WO | 2015135596 A1 | 9/2015 |
| WO | 2016032104 A1 | 3/2016 |

(Continued)

*Primary Examiner* — Dhaval Patel
(74) *Attorney, Agent, or Firm* — Murphy, Bilak & Homiller, PLLC

(57) ABSTRACT

Techniques disclosed herein involve network-side and device-side operations that provide for the advantageous use of a reduced set of precoders within a larger full set of precoders. The reduced set is identified dynamically, based on characteristics of the channel between a radio network node and a wireless device, and the use of a defined mapping function that maps the reduced set of precoders within the larger full set to a reduced set of index values. Reporting precoders from the reduced set offers significant reductions in signaling overhead because of the smaller size of the index values used to index the reduced set, while simultaneously offering the ability to choose from precoders matched to current channel conditions.

36 Claims, 9 Drawing Sheets

(56) References Cited

U.S. PATENT DOCUMENTS

| | | |
|---|---|---|
| 2015/0207552 A1 | 7/2015 | Nammi et al. |
| 2015/0215023 A1 | 7/2015 | Thurfjell |
| 2015/0358062 A1 | 12/2015 | Skillermark et al. |
| 2016/0094284 A1 | 3/2016 | Yum et al. |
| 2016/0127018 A1 | 5/2016 | Nammi et al. |
| 2016/0301455 A1* | 10/2016 | Nammi ................ H04B 7/0469 |
| 2017/0222699 A1* | 8/2017 | Scherb ................ H04B 7/0456 |
| 2017/0272223 A1 | 9/2017 | Kim et al. |

FOREIGN PATENT DOCUMENTS

| | | |
|---|---|---|
| WO | 2016114708 A2 | 7/2016 |
| WO | 2017138852 A1 | 8/2017 |

\* cited by examiner

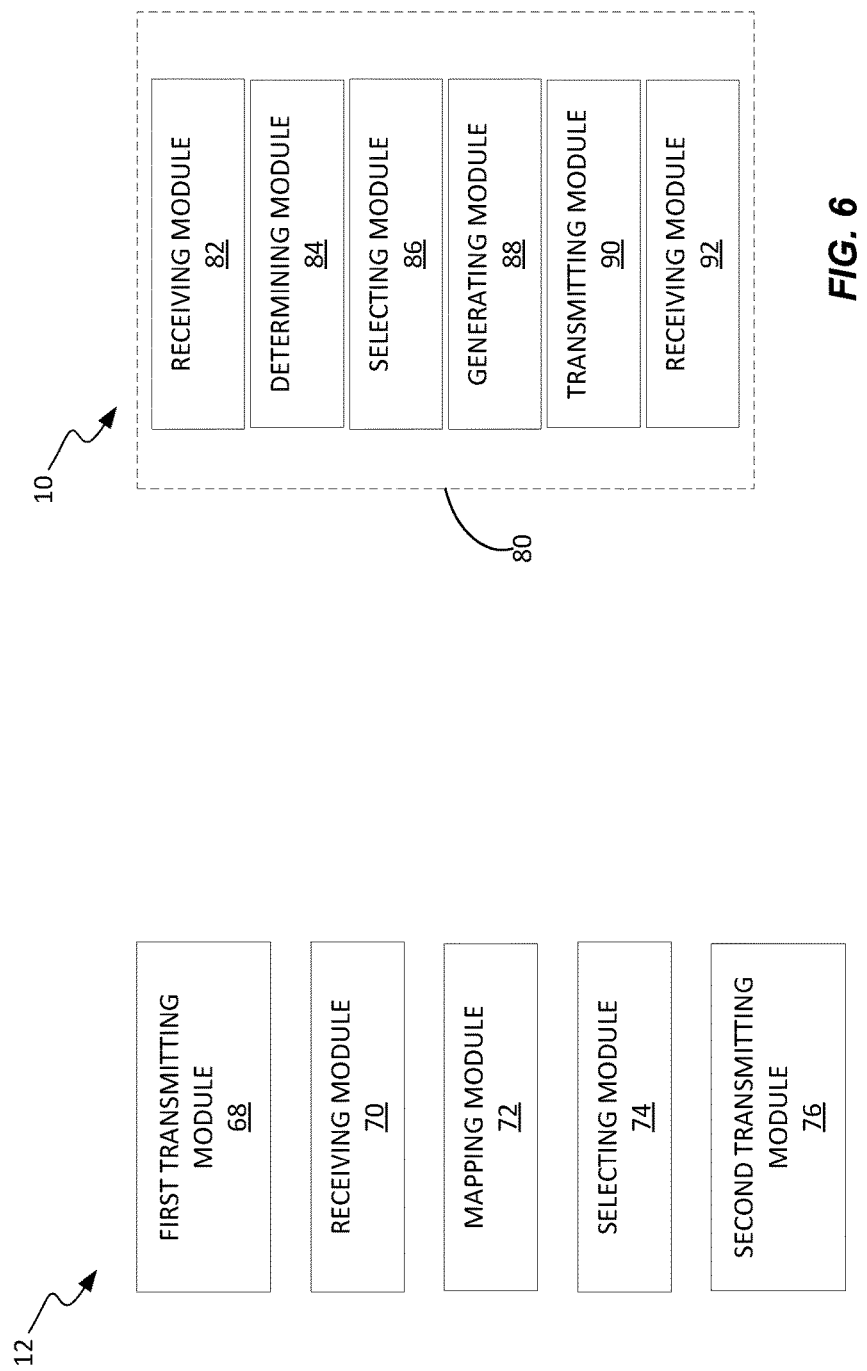

METHODS AND APPARATUS FOR PRECODING CONTROL IN A WIRELESS COMMUNICATION NETWORK

TECHNICAL FIELD

The present invention relates to wireless communication networks and particularly relates to precoding control in a wireless communication network.

BACKGROUND

In many wireless communications systems, Channel-State Information, CSI, feedback is crucial for obtaining good performance between a transmitting entity and a receiving entity. For example, the transmitting entity transmits references signals that provide the receiving entity with a basis for estimating channel state. Reported CSI feedback from the receiving entity typically includes a Channel-Quality Indicator, CQI, a Rank Indicator, RI, and a Precoding Matrix Indicator, PMI. The CQI value serves as a quantized representation of measured signal quality, the RI value indicates the number of transmission layers that can be supported, and the PMI value indicates a preferred precoder—i.e., a preferred set of antenna weights to be used for performing a multi-antenna transmission from or to the reporting entity. In general, the entity reporting CSI and the entity receiving the CSI report have knowledge of a defined codebook that contains some number of precoders, wherein the PMI "points" to a preferred one of the precoders within the codebook.

The Third Generation Partnership Project, 3GPP, Long Term Evolution, LTE, system supports CSI-reporting schemes that rely on the reference symbols being transmitted periodically. The LTE radio structure uses on recurring frames of a defined duration, with each frame subdivided into a regular number of subframes. In this context, cell-specific reference symbols, CRS, are sent every subframe, for example, while user-specific CSI Reference Symbols, CSI-RS, may be sent with a larger periodicity. User Equipments, UEs, using Transmission Mode 10, TM10, rely solely on CSI-RS resources, while other UEs typically use the CRS at least for interference measurements.

UEs operating in an LTE system transmit CSI reports either on the Physical Uplink Control Channel, PUCCH, or the Physical Uplink Shared Channel, PUSCH. CSI reporting on the PUSCH involves the transmission of CSI along with whatever data is being transmitted on the PUSCH. TM10 UEs can be configured to report CSI for multiple CSI-processes, which each may have different CSI-measurement resources. A CSI-measurement resource, CSI-MR, consists of a CSI-RS resource and a CSI Interference Measurement, CSI-IM, resource. Both the CSI-RS and the CSI-IM resources are divided into sets of resources, where each set is identified by CSI-RS configuration index. Each CSI-RS configuration index contains resources in every Physical Resource Block, PRB, in the involved frequency band. A subframe configuration specifies a subframe periodicity and a subframe offset that specify for the UE at which time instances the respective measurement resources are available.

As the number of antenna elements used at access nodes in the radio network increases, the size of the precoder codebooks used for precoding from these larger sets of antenna elements also increases. In the early releases of LTE, the number of different precoders was rather limited. For example, two rank-2 precoders were specified for two antenna ports, four rank-1. For four antenna ports, sixteen different precoders were specified. The number of bits in the CSI report to indicate the desired precoder was limited to two and four bits for two and four antenna ports, respectively. However, Release 11, R-11, of the 3GPP specifications extended precoder support up to eight antenna ports, resulting in a significant expansion in the size of the precoder codebook. For example, for rank one and two, eight bits is required to indicate the desired precoder. Release 13, R-13, extended precoding support for up to sixteen antenna ports and providing for up to eight transmission layers, i.e., Rank 8 transmissions, with over-sampling of the precoder codebook. These changes again increased the number of bits needed to indicate a desired precoder from the precoder codebook. For example, using sixteen antenna ports and with configuration parameters ($N_1$, $N_2$) . . . is required to indicate a desired precoder from the defined codebook, if the rank is at most two.

As the number of antenna ports increases, the number of feedback bits required in the CSI report increases. While the increased overhead may not be significant when reporting CSI over PUSCH, PUCCH is a scarce resource shared among all UEs in a cell, and significantly increasing CSI reporting overhead on the PUCCH is problematic.

For the Fifth Generation, 5G, systems now under development—e.g., systems using the "New Radio" or NR interface now being standardized—the number of transmit antennas on the network side are expected to increase dramatically, as compared to current systems. For example, a radio access node may be equipped with several hundred antennas (or antenna elements), allowing sophisticated beamforming. It is recognized herein that existing approaches to precoding control, including existing approaches to evaluating and reporting preferred precoders, do not scale well as the number of antenna ports increases.

As one example, consider that a UE or other wireless device needs to allocate significant computational resources when evaluating large codebooks to identify preferred precoders. It may be difficult, for example, for a wireless device to evaluate large sets of precoders within the time constraints associated with ongoing communications. Even allowing for continued improvements in the processing capabilities of wireless devices, the power expended on large sets of computations will negatively affect the battery life of such devices.

To see the complexity associated with evaluating a set of precoders, consider the well-known Maximum Mean Square Error, MMSE, receiver, wherein a precoder P, from a set of precoders S, is determined such that the Signal-to-Noise-and-Interference-Ratio, SINR, representing a quality estimate q(P) is maximized. Hence, the problem becomes $$P = \mathrm{argmax}_{P \in S}\, q(P).$$

To determine the SINR for layer l for a channel matrix H and interference and noise covariance matrix Q when using the precoder P, the following computations may be carried out at the wireless device:

$$R = (HPP^*H^* + Q)$$

$$W = P^*H^*R^{-1}$$

$$Q_x = 1 - WHP + WQW^+$$

$$SINR_l(P) = \frac{([WHP]_{l,l})^2}{[Q_x]_{l,l}}$$

$$q(P) = \sum_l SINR_l(P)$$

The preceding computations involve complex matrix multiplications and inverses and some computations involve P and require that q(P) is evaluated per P, i.e., per precoder being evaluated. This fact means that when evaluating which precoder is preferred, numerous computations are required when the overall set of precoders is large, i.e., when the codebook is large.

SUMMARY

Techniques disclosed herein involve network-side and device-side operations that provide for the advantageous use of a reduced set of precoders within a larger full set of precoders. The reduced set is identified dynamically, based on characteristics of the channel between a radio network node and a wireless device, and the use of a defined mapping function that maps the reduced set of precoders within the larger full set to a reduced set of index values. Reporting precoders from the reduced set offers significant reductions in signaling overhead because of the smaller size of the index values used to index the reduced set, while simultaneously offering the ability to choose from precoders matched to current channel conditions.

An example method is performed by a wireless communication device configured for operation in a wireless communication network that includes a radio network node. The method includes transmitting a channel-characterizing signal to the radio network node. The signal indicates a channel characteristic as determined by the wireless communication device, or enables the radio network node to derive the channel characteristic based on the channel-characterizing signal as received at the radio network node. The channel characteristic shall be understood as one or more properties or parameters that characterize a channel between the radio network node and the wireless communication device.

The method further includes receiving configuration information from the radio network node, indicating a reduced set of precoders within a full set of precoders are indexed by a full set of index values. The full set of precoders are contained in a codebook defined in the wireless communication device, and the reduced set of precoders are dynamically determined in dependence on the channel characteristic. Still, further, the method includes mapping a reduced set of index values to the reduced set of precoders according to a defined mapping function, where the reduced set of index values is smaller than the first set of index values. The method additionally includes selecting one of the precoders from the reduced set of precoders. The precoder is selected in dependence on currently estimated channel conditions between the radio network node and wireless communication device, for use in transmitting from the wireless communication device to the radio network node or from the radio network node to the wireless communication device, and the method further includes transmitting, for the radio network node, an indication of the index value from the reduced index set that corresponds to the selected precoder.

In a corresponding example, a wireless communication device is configured for operation in a wireless communication network that includes a radio network node, and the wireless device includes communication circuitry and processing circuitry. The communication circuitry is configured for transmitting signals to and receiving signals from the radio network node, and the processing circuitry is operatively associated with the communication circuitry and configured to perform certain operations.

In particular, the processing circuitry is configured to transmit a channel-characterizing signal to the radio network node that indicates a channel characteristic as determined by the wireless communication device or enables the radio network node to derive the channel characteristic based on the channel-characterizing signal as received at the radio network node. The channel characteristic characterizes a channel between the radio network node and the wireless communication device.

The processing circuitry is further configured to receive configuration information from the radio network node, indicating a reduced set of precoders within a full set of precoders are indexed by a full set of index values. The full set of precoders is contained in a codebook defined in the wireless communication device, and the reduced set of precoders are dynamically determined in dependence on the channel characteristic. The processing circuitry is further configured to map a reduced set of index values to the reduced set of precoders according to a defined mapping function, the reduced set of index values being smaller than the first set of index values, and select one of the precoders from the reduced set of precoders, in dependence on currently estimated channel conditions between the radio network node and wireless communication device, for use in transmitting from the wireless communication device to the radio network node or from the radio network node to the wireless communication device. Still further, the processing circuitry is configured to transmit, for the radio network node, an indication of the index value from the reduced index set that corresponds to the selected precoder.

In a complementary example, a method performed by a radio network node configured for operation in a wireless communication network includes controlling, at least at certain times or under certain conditions, precoder selection by a wireless communication device operating in the wireless communication network. Controlling in this context comprises receiving a channel-characterizing signal from the wireless communication device, determining, from the channel-characterizing signal, channel state information for a propagation channel between the radio network node and the wireless communication device, and selecting, in consideration of the channel state information, a reduced set of precoders within a full set of precoders that are indexed by a full set of index values. The full set of precoders is contained in a codebook defined in the radio network node, and the method further includes generating configuration information indicating the reduced set of precoders. The precoders within the reduced set of precoders are defined by respective index values in a reduced set of index values that is smaller than the full set of index values and mapped to the reduced set of precoders according to a defined mapping function.

The method additionally includes transmitting the configuration information to the wireless device, to thereby enable the wireless device to perform precoder selection within the reduced set of precoders, rather than the full set of precoders, at least at certain times or under certain conditions. Still further, the method includes receiving one or more precoder selection indications from the wireless communication device, the one or more precoder selection indications being limited to indicating precoders in the reduced set of precoders and comprising or corresponding to the corresponding index values from the reduced set of index values.

In another example embodiment, a radio network node is configured for operation in a wireless communication network and includes communication circuitry and processing circuitry. The communication circuitry is configured for transmitting signals to and receiving signals from wireless communication devices operating in the wireless communication network, and the processing circuitry is operatively associated with the communication circuitry and configured to carry out certain operations.

Specifically, the processing circuitry is configured to control, at least at certain times or under certain conditions, precoder selection by a wireless communication device operating in the wireless communication network. To control precoder selection, the processing circuitry is configured to receive a channel-characterizing signal from the wireless communication device and determine from that signal channel state information for a propagation channel between the radio network node and the wireless communication device. Further, the processing circuitry is configured to select, in consideration of the channel state information, a reduced set of precoders within a full set of precoders that are indexed by a full set of index values, the full set of precoders being contained in a codebook defined in the radio network node. Still further, the processing circuitry is configured to generate configuration information indicating the reduced set of precoders, wherein the precoders within the reduced set of precoders are defined by respective index values in a reduced set of index values that is smaller than the full set of index values and mapped to the reduced set of precoders according to a defined mapping function, and transmit the configuration information to the wireless device.

Transmitting the configuration information enables the wireless device to perform precoder selection with respect to the reduced set of precoders, rather than the full set of precoders, at least at certain times or under certain conditions. Correspondingly, the processing circuitry is configured to receive one or more precoder selection indications from the wireless communication device, the one or more precoder selection indications being limited to indicating precoders in the reduced set of precoders and comprising or corresponding to the corresponding index values from the reduced set of index values.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIGS. 5 and 6 are block diagrams of one embodiment of processing modules implemented in a wireless communication device and a radio network node, respectively.

DETAILED DESCRIPTION

Figure 1:
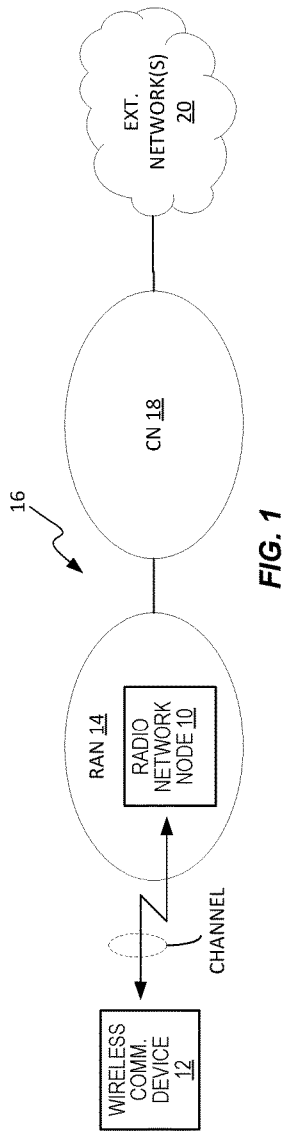
FIG. 1 is a block diagram of one embodiment of a wireless communication network.

FIG. 1 depicts a radio network node 10 and a wireless communication device 12. The radio network node 10 is associated with a Radio Access Network, RAN, 14 of a wireless communication network 16. The RAN 14 along with a Core Network, CN, 18 form the wireless communication network 16, which may include further nodes not explicitly shown in the diagram. The network 16 provides communication services to the wireless communication device 12, e.g., by operatively connecting it to one or more external networks 20, such as the Internet. In a non-limiting example, the network 16 comprises Wide Area Access Network or WAN, e.g., a cellular network based on 3GPP specifications. Example implementations include LTE-based implementations, as well as 5G implementations involving the New Radio, NR, interface.

Figure 2:
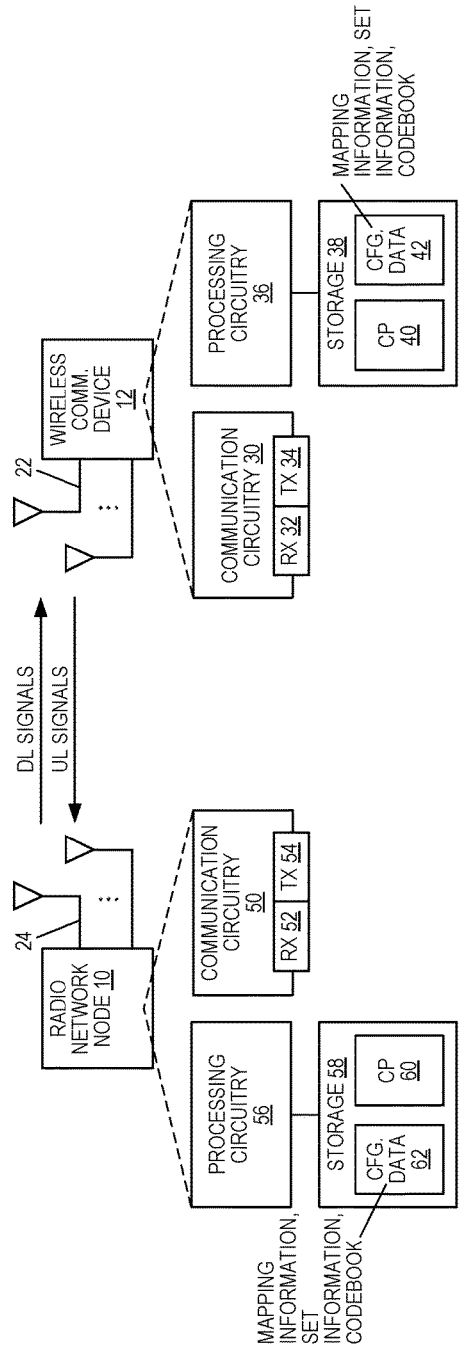
FIG. 2 is a block diagram of example embodiments of a radio network node and a wireless communication device.

FIG. 2 illustrates further example details for the wireless communication device 12 and the radio network node 10. The wireless communication device 12 includes one or more antennas 22, and the radio network node 10 includes a potentially large number of antennas 24, for receiving and/or transmitting. Here, the term "antenna" will be understood as encompassing "antenna elements," such as where the radio network node 10 includes one or more arrays of antenna elements, e.g., for beamforming.

According to further example details, the wireless communication device 12 includes communication circuitry 30 that provides physical-layer connectivity for transmitting and receiving communication signals from the antenna(s) 22. As an example, the communication circuitry 30 includes receiver circuitry 32 and transmitter circuitry 34 configured for cellular or other radio communications, according to the air interface standards and associated signaling protocols used by the network 16. The communication circuitry 30 may include further circuits, e.g., supporting BLUETOOTH, WIFI, or other local connectivity.

Further componentry includes processing circuitry 36, which, in at least some embodiments, includes or is associated with storage 38. The processing circuitry 36 comprises fixed circuitry, programmed circuitry, or a mix of fixed and programmed circuitry. Functionally, the processing circuitry 36 may perform at least some baseband processing associated with transmitting and receiving signals via the communication circuitry 30. The processing circuitry 36 may also be configured to provide overall communication and control processing, etc.

The processing circuitry 36 comprises, for example, one or more microprocessors, digital signal processors, application specific integrated circuits, field programmable gate arrays, or other digital processing circuits. In at least one embodiment, the processing circuitry 36 comprises at least one processor and a memory storing a computer program comprising program instructions for execution by the at least one processor, whereby the at least one processor is configured to cause the wireless communication device 12 to operate as described herein.

Thus, the storage 38 may comprise one or more types of computer-readable memory providing non-transitory storage for a computer program 40 (abbreviated as "CP" in the diagram), for execution by a processor of the wireless communication device 12. The storage 38 may store other information, such as one or more items of configuration data 42 (abbreviated in "CFG. DATA" in the diagram). The configuration data 42 may include a defined codebook or information allowing the wireless communication device 12 to determine the precoders included in a defined codebook. Notably, "non-transitory" does not necessarily mean permanent or unchanging storage, but does connote storage of at least some persistence. In this regard, the storage 38 may include program memory or storage and working memory or storage, with the former being non-volatile and the latter being volatile. Non-limiting examples include any one or more of FLASH, EEPROM, SRAM, and DRAM circuitry and/or electromagnetic or solid-state disk storage.

Similar details apply to the radio network node 10, although it may have considerably more complexity and operate at higher power as compared to the wireless communication device 12, and it may include various computer or network interfaces not seen in the wireless communication device 12, for interfacing with other nodes or systems in the network 16. Broadly, however, the radio network node 10 includes communication circuitry 50, which provides physical-layer connectivity for transmitting and receiving communication signals from the antennas 24. As an example, the communication circuitry 50 includes receiver circuitry 52 and transmitter circuitry 54 configured for cellular or other radio communications, according to the air interface standards and associated signaling protocols used by the network 16. Such circuitry may be implemented in resource pools or other plural configurations for use in supporting connections and associated processing for relatively large numbers of wireless communication devices.

Further componentry includes processing circuitry 56, which, in at least some embodiments, includes or is associated with storage 58. The processing circuitry 56 comprises fixed circuitry, programmed circuitry, or a mix of fixed and programmed circuitry. Functionally, the processing circuitry 56 may perform at least some baseband processing associated with transmitting and receiving signals via the communication circuitry 50. The processing circuitry 56 may also be configured to provide overall communication and control processing, etc.

The processing circuitry 56 comprises, for example, one or more microprocessors, digital signal processors, application specific integrated circuits, field programmable gate arrays, or other digital processing circuits. In at least one embodiment, the processing circuitry 56 comprises at least one processor and a memory storing a computer program comprising program instructions for execution by the at least one processor, whereby the at least one processor is configured to cause the radio network node 10 to operate as described herein.

Thus, the storage 58 comprises one or more types of computer-readable memory providing non-transitory storage for a computer program 60 (abbreviated in "CP"), for execution by a processor of the radio network node 10. The storage 58 may store other information, such as one or more items of configuration data 62 (abbreviated as "CFG. DATA"). Notably, "non-transitory" does not necessarily mean permanent or unchanging, but does connote storage of at least some persistence. In this regard, the storage 58 may include program memory or storage and working memory or storage, with the former being non-volatile and the latter being volatile. Non-limiting examples include any one or more of FLASH, EEPROM, SRAM, and DRAM circuitry and/or electromagnetic or solid-state disk storage.

In the above description, and elsewhere in the specification, references to items, entities, or components in the singular do not exclude the possibility of plural implementations, unless noted. For example, references to "a processor" are not limited to single-processor implementations and broadly encompass implementations using plural processors operating cooperatively for various ones of the involved functions. Similarly, references to "a node," such as "the radio network node 10", do not exclude multi-node or distributed implementations.

With the example details of FIG. 2 in mind, a wireless communication device 12 is configured for operation in a wireless communication network 16 that includes a radio network node 10. The wireless communication device 12 includes communication circuitry 30 configured for transmitting signals to and receiving signals from the radio network node 10 and processing circuitry 36 that operatively associated with the communication circuitry 30.

The processing circuitry 36 in at least some embodiments is configured to transmit a channel-characterizing signal to the radio network node 10 that indicates a channel characteristic as determined by the wireless communication device 12, or enables the radio network node 10 to derive the channel characteristic based on the channel-characterizing signal as received at the radio network node 10. The channel characteristic characterizes a channel between the radio network node 10 and the wireless communication device 12. Further, the processing circuitry 36 is configured to: receive configuration information from the radio network node 10, indicating a reduced set of precoders within a full set of precoders are indexed by a full set of index values, the full set of precoders contained in a codebook defined in the wireless communication device 12 and the reduced set of precoders being dynamically determined in dependence on the channel characteristic; map a reduced set of index values to the reduced set of precoders according to a defined mapping function, the reduced set of index values being smaller than the first set of index values; select one of the precoders from the reduced set of precoders, in dependence on currently estimated channel conditions between the radio network node 10 and wireless communication device 12, for use in transmitting from the wireless communication device 12 to the radio network node 10 or from the radio network node 10 to the wireless communication device 12; and transmit, for the radio network node 10, an indication of the index value from the reduced index set that corresponds to the selected precoder.

In one or more embodiments, the processing circuitry 36 is configured to, before transmitting the channel-characterizing signal, use a previously indicated reduced subset of precoders within the full set of precoders, the previously indicated subset being one among a plurality of defined subsets within the full set. In this arrangement, the processing circuitry 36 is configured to receive a request from the radio network node 10 to transmit the channel-characterizing signal, and to transmit the channel-characterizing signal by selecting a currently preferred one of the defined subsets in response to the request and sending an indication of the currently preferred subset to the radio network node 10. For example, the radio network node 10 sends a toggle bit, flag, or another indicator, indicating that the wireless communication device 12 should update its selection of a preferred subset from among a defined plurality of subsets.

In one or more embodiments, the processing circuitry 36 is configured to transmit the channel-characterizing signal by determining a precoder vector and transmitting an indication of the precoder vector. The precoder vector is not constrained to the full set of precoders, and it represents phases and/or amplitudes for multi-antenna transmission, as determined by the wireless communication device 12 in dependence on currently estimated channel conditions at the wireless communication device 12.

In one or more embodiments, the processing circuitry 36 is configured to transmit the channel-characterizing signal by transmitting an uplink reference signal, the reception of which at the radio network node 10 enables the radio network node 10 to determine the channel characteristic. In one or more other embodiments, the processing circuitry 36 is configured to transmit the channel-characterizing signal by transmitting an indication of channel state information, and to determine the channel state information based on receiving a downlink reference signal transmitted by the radio network node 10. In still other embodiments, the processing circuitry 36 is configured to transmit the channel-characterizing signal by reporting a precoder having certain beamforming properties associated with it, thereby enabling the radio network node 10 to determine the reduced set of precoders by identifying the beamforming properties of the reported precoder.

In at least one embodiment, the processing circuitry 36 is configured to determine the defined mapping function from the configuration information received from the network 16. The defined mapping imposes a one-to-one mapping between the index values comprising the reduced set of index values and the precoders comprising the reduced set of precoders.

Further, in at least one embodiment, the processing circuitry 36 is configured to choose between operation in a first precoder selection mode and operation in a second precoder selection mode. The first precoder selection mode considers the full set of precoders and includes selecting and reporting precoders from the full set of precoders. The second precoder selection mode considers the reduced set of precoders and includes selecting and reporting precoders from the reduced set of precoders according to the defined mapping between precoders and index values.

The processing circuitry 36 is configured to choose between the first precoder selection mode and the second precoder selection mode, for example, in dependence on at least one of control signaling from the radio network node 10 and a type of transmission used for reporting precoder selections. Here, different types of transmissions are associated with different signaling overheads, and reporting precoder selections using the reduced set of index values involves a lower signaling overhead in comparison to reporting precoder selections using the full set of index values.

In a complementary embodiment or embodiments, the radio network node 10 includes communication circuitry 50 configured for transmitting signals to and receiving signals from wireless communication devices operating in the network 16. Such devices include, e.g., the device 12 and one or more other devices that may or may not have the same capabilities. The radio network node 10, in general, may support a mix of device types.

The radio network node 10 further includes processing circuitry 56 that is operatively associated with the communication circuitry 50 and configured to control, at least at certain times or under certain conditions, precoder selection by a wireless communication device 12 operating in the network 16. Such control is based on the processing circuitry 56 being configured to receive a channel-characterizing signal from the wireless communication device 12, and to determine, from the channel-characterizing signal, channel state information for a propagation channel between the radio network node 10 and the wireless communication device 12. The processing circuitry 56 is further configured to select, in consideration of the channel state information, a reduced set of precoders within a full set of precoders that are indexed by a full set of index values.

Here, the full set of precoders is contained in a codebook defined in the radio network node 10, and the processing circuitry 56 is configured to generate configuration information indicating the reduced set of precoders. The precoders within the reduced set of precoders are defined by respective index values in a reduced set of index values that is smaller than the full set of index values and mapped to the reduced set of precoders according to a defined mapping function.

Still further, the processing circuitry 10 is configured to transmit the configuration information to the wireless device 12, to thereby enable the wireless device 12 to perform precoder selection with respect to the reduced set of precoders, rather than the full set of precoders, at least at certain times or under certain conditions. The processing circuitry 56 is also configured to receive one or more precoder selection indications from the wireless communication device 12, where the one or more precoder selection indications are limited to indicating precoders in the reduced set of precoders and comprise or correspond to the corresponding index values from the reduced set of index values.

In at least one embodiment, the processing circuitry 56 is configured to receive the channel-characterizing signal at multiple reception instances. The multiple reception instances reflect changing propagation channel conditions, and the processing circuitry 56 is configured to control precoder selection by the wireless device 12 by performing a dynamic process responsive to the changing propagation channel conditions. By way of this dynamic process, the radio network node 10 updates its selection of the reduced set of precoders responsive to the changing propagation channel conditions and correspondingly updates the configuration information for transmission to the wireless communication device 12.

The processing circuitry 56 in one or more embodiments is configured to operate with a plurality of defined reduced sets of precoders, to select the reduced set of precoders by selecting one of the defined reduced sets of precoders, and to generate the configuration information to include a set indicator that corresponds to the selected defined reduced set of precoders. In at least some such embodiments, the wireless communication device 12 sends an indication of its currently preferred one of the subsets.

As noted, such an indication may be sent by the wireless communication device 12 as a channel-characterizing signal, which is received (processed) at the radio network node 10. The radio network node 10 in one or more embodiments is configured to request that the wireless communication device 12 send the channel-characterizing signal, e.g., periodically, or triggered, such as in view of changing channel conditions. For example, the processing circuitry 56 of the radio network node 10 may be configured to send a toggle bit, flag, or another indicator, indicating that the wireless communication device 12 should send an indication of its currently preferred precoder subset.

In at least one embodiment, the processing circuitry 56 is configured to receive a channel-characterizing signal from the wireless communication device 12 that indicates a precoder vector representing phases and/or amplitudes for multi-antenna transmission, as determined by the wireless communication device 12 in dependence on currently estimated channel conditions at the wireless communication device. The precoder vector is not constrained to the full set of precoders, but the processing circuitry 56 is configured to identify precoders in the full set that have properties corresponding to indicated precoder vector.

In at least one embodiment, the processing circuitry 56 is configured to receive an uplink reference signal as the channel-characterizing signal and to determine the channel state information based on the uplink reference signal as received at the radio network node 10. In other embodiments, the channel-characterizing signal includes the channel state information, and the processing circuitry 56 is configured to determine the channel state information by obtaining the channel state information from the channel-characterizing signal. Still further, in at least some embodiments, the channel-characterizing signal is a reported precoder having certain beamforming properties associated with it, and the processing circuitry 56 is configured to determine the channel state information by identifying the beamforming properties of the reported precoder.

It shall be understood that in one or more embodiments, the processing circuitry 56 is configured to receive a channel-characterizing signal of any two or more of the above-described signal types. For example, different wireless communication devices 12 may be configured differently, such that they send different types of channel characterizing signals, where the processing circuitry 56 is configured to support all such devices. Alternatively, it may be that a given wireless communication device 12 sends different types of channel-characterizing signals at different times or under different circumstances.

Turning to other aspects, the processing circuitry 56 is configured to indicate the defined mapping function in the configuration information for use by the wireless communication device 12. The defined mapping imposes a one-to-one mapping between the index values comprising the reduced set of index values and the precoders comprising the reduced set of precoders.

In at least one embodiment, the certain times or the certain conditions mentioned above include operation of the wireless communication device 12 in a second mode, where the wireless communication device 12 operates with the reduced set of precoders and reports precoder selections from the reduced set of precoders using the reduced set of index values. In such embodiments, the processing circuitry 56 is configured to select between the second mode of operation and a first mode of operation, where the wireless communication device 12 operates with the full set of precoders and reports precoder selections from the full set of precoders using the full set of index values.

For example, the processing circuitry 56 is configured to choose between the first mode and the second mode in dependence on at least one of scheduling considerations at the radio network node 10 involving a plurality of wireless communication devices, and a type of transmission being used by the wireless communication device 12 for reporting precoder selections. Different types of transmissions are associated with different signaling overheads, and reporting precoder selections using the reduced set of index values involves a lower signaling overhead in comparison to reporting precoder selections using the full set of index values.

Figure 3:
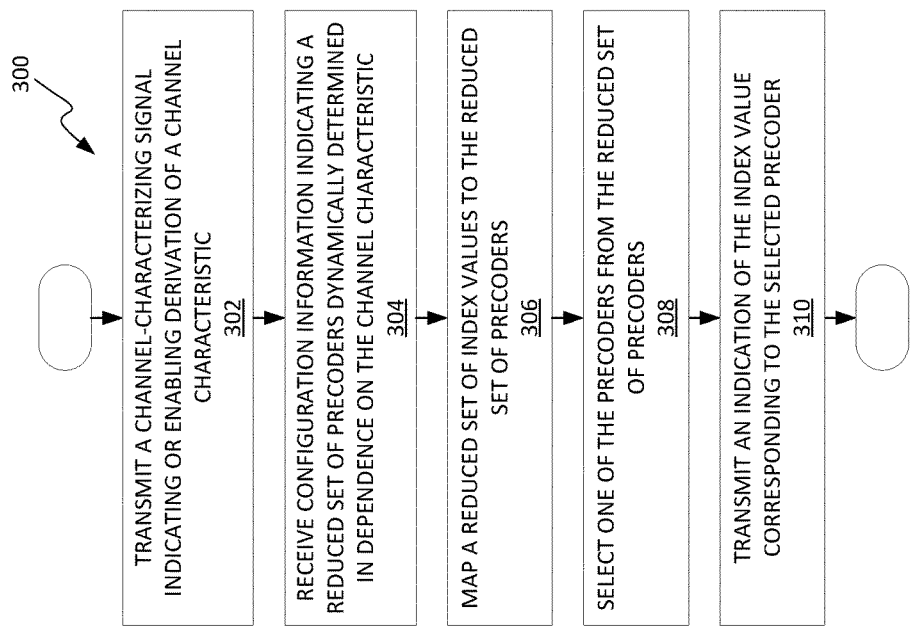
FIG. 3 is a logic flow diagram of one embodiment of a method performed by a wireless communication device operating in a wireless communication network.

FIG. 3 illustrates a method 300 performed by a wireless communication device 12 configured for operation in a wireless communication network 16 that includes a radio network node 10. The method 300 may be performed by the wireless communication device 12 illustrated in FIG. 2, but the implementation of the method 300 is not limited to the example arrangement of circuitry depicted in FIG. 2.

The method 300 includes a wireless communication device 12: transmitting (Block 302) a channel-characterizing signal to the radio network node 10 that indicates a channel characteristic as determined by the wireless communication device 12, or enables the radio network node 10 to derive the channel characteristic based on the channel-characterizing signal as received at the radio network node 10, said channel characteristic characterizing a channel between the radio network node 10 and the wireless communication device 12; receiving (Block 304) configuration information from the radio network node 10, indicating a reduced set of precoders within a full set of precoders are indexed by a full set of index values, the full set of precoders contained in a codebook defined in the wireless communication device 12 and the reduced set of precoders being dynamically determined in dependence on the channel characteristic; mapping (Block 306) a reduced set of index values to the reduced set of precoders according to a defined mapping function, the reduced set of index values being smaller than the first set of index values; selecting (Block 308) one of the precoders from the reduced set of precoders, in dependence on currently estimated channel conditions between the radio network node 10 and wireless communication device 12, for use in transmitting from the wireless communication device 12 to the radio network node 10 or from the radio network node 10 to the wireless communication device 12; and transmitting (Block 310), for the radio network node 10, an indication of the index value from the reduced index set that corresponds to the selected precoder.

Figure 4:
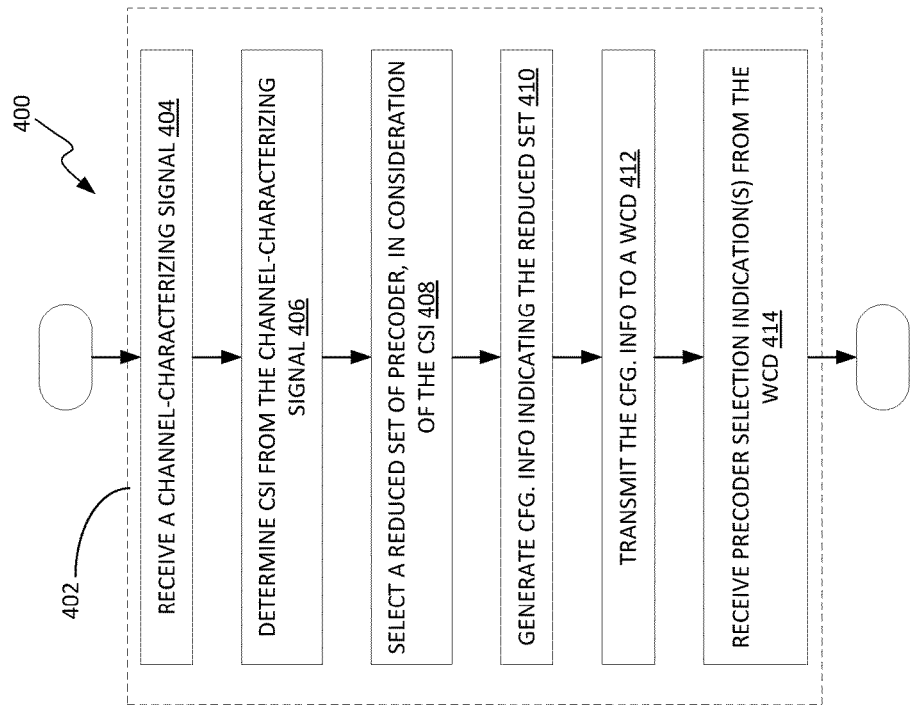
FIG. 4 is a logic flow diagram of one embodiment of a method performed by a radio network node operating in a wireless communication network.

FIG. 4 illustrates a method 400 that may be implemented by the radio network node 10 introduced in FIG. 2, although the method 400 is not limited to implementation via the arrangement of circuitry depicted in FIG. 2. The method 400 includes controlling (Block 402), at least at certain times or under certain conditions, precoder selection by a wireless communication device 12 operating in the wireless communication network 16.

The controlling operations include receiving (Block 404) a channel-characterizing signal from the wireless communication device 12 and determining (Block 406), from the channel-characterizing signal, channel state information (CSI) for a propagation channel between the radio network node 10 and the wireless communication device 12. The method 400 further includes selecting (Block 408), in consideration of the channel state information, a reduced set of precoders within a full set of precoders that are indexed by a full set of index values. Here a codebook defined in the radio network node 10 contains the full set of precoders.

Controlling further includes generating (Block 410) configuration information indicating the reduced set of precoders. The precoders within the reduced set of precoders are defined by respective index values in a reduced set of index values that is smaller than the full set of index values and mapped to the reduced set of precoders according to a defined mapping function. Still further, controlling includes transmitting (Block 412) the configuration information to the wireless device 12, thereby enabling the wireless device 12 to perform precoder selection with respect to the reduced set of precoders, rather than the full set of precoders, at least at certain times or under certain conditions. Additionally, the method 400 includes receiving (Block 414) one or more precoder selection indications from the wireless communication device 12, the one or more precoder selection indications being limited to indicating precoders in the reduced set of precoders and comprising or corresponding to the corresponding index values from the reduced set of index values.

In an example implementation depicted in FIG. 5, the wireless communication device 12 functionally implements several processing modules or circuits, such as a first transmitting module 68 for transmitting a channel-characterizing signal to the radio network node 10 that indicates a channel characteristic as determined by the wireless communication device 12, or enables the radio network node 10 to derive the channel characteristic based on the channel-characterizing signal as received at the radio network node 10. The channel characteristic characterizes a channel between the radio network node 10 and the wireless communication device 12.

Further example modules include a receiving module 70, for receiving configuration information from the radio network node 10, indicating a reduced set of precoders within a full set of precoders are indexed by a full set of index values, the full set of precoders contained in a codebook defined in the wireless communication device 12 and the reduced set of precoders being dynamically determined in dependence on the channel characteristic. Still further example modules include a mapping module 72 for mapping a reduced set of index values to the reduced set of precoders according to a defined mapping function, the reduced set of index values being smaller than the first set of index values; a selecting module 74 for selecting one of the precoders from the reduced set of precoders, in dependence on currently estimated channel conditions between the radio network node 10 and wireless communication device 12, for use in transmitting from the wireless communication device 12 to the radio network node 10 or from the radio network node 10 to the wireless communication device 12; and a second transmitting module 76, for transmitting to the radio network node 10, an indication of the index value from the reduced index set that corresponds to the selected precoder.

FIG. 6 depicts an example arrangement of modules implemented within a radio network node 10, wherein the overall arrangement 80 is configured to control, at least at certain times or under certain conditions, precoder selection by a wireless communication device 12 operating in the wireless communication network 16. The arrangement 80 includes a receiving module 82 configured to receive a channel-characterizing signal from the wireless communication device 12, and a determining module 84 configured to determine, from the channel-characterizing signal, channel state information for a propagation channel between the radio network node 10 and the wireless communication device 12.

The arrangement 80 further includes a selecting module 86 that is configured to select, in consideration of the channel state information, a reduced set of precoders within a full set of precoders. The full set of precoders are indexed by a full set of index values, and they are contained in a codebook defined in the radio network node 10. Additional modules include a generating module 88 that is configured to generate configuration information indicating the reduced set of precoders. The precoders within the reduced set of precoders are identified by respective index values in a reduced set of index values that is smaller than the full set of index values and mapped to the reduced set of precoders according to a defined mapping function.

The arrangement 80 further includes a transmitting module 90 that is configured to transmit the configuration information to the wireless device 12. Doing so enables the wireless communication device 12 to perform precoder selection with respect to the reduced set of precoders, rather than the full set of precoders, at least at certain times or under certain conditions. The arrangement 80 also includes a receiving module 92 that is configured to receive one or more precoder selection indications from the wireless communication device 12. The one or more precoder selection indications are limited to indicating precoders in the reduced set of precoders and comprise or correspond to the corresponding index values from the reduced set of index values.

The methods and apparatus detailed in the above examples provide advantageous mechanisms for using codebooks larger than can be indicated in a CSI report, or, at least larger than can be indicated in the configured or available bit-field or information-element size used for CSI reporting.

As explained, a wireless communication device 12 is configured with a reduced codebook that is a subset of a larger, overall codebook and the wireless communication device 12 performs a mapping from the reduced codebook to a set of reporting indices to be used for the reduced codebook. For example, the wireless communication device 12 uses a CSI report to report a precoder from the reduced codebook, based on sending or indicating the index obtained by the defined mapping.

The same or substantially similar processing can also be used to provide a method of using a larger codebook in the uplink than can be indicated in an uplink grant. A wireless communication device 12 is configured with a reduced codebook within a larger codebook and maps from the reduced codebook to a set of reporting indices to be used for the reduced codebook. The uplink grant then indicates a precoder from the reduced codebook as the index obtained by the mapping from the signaled precoder.

Figure 7:
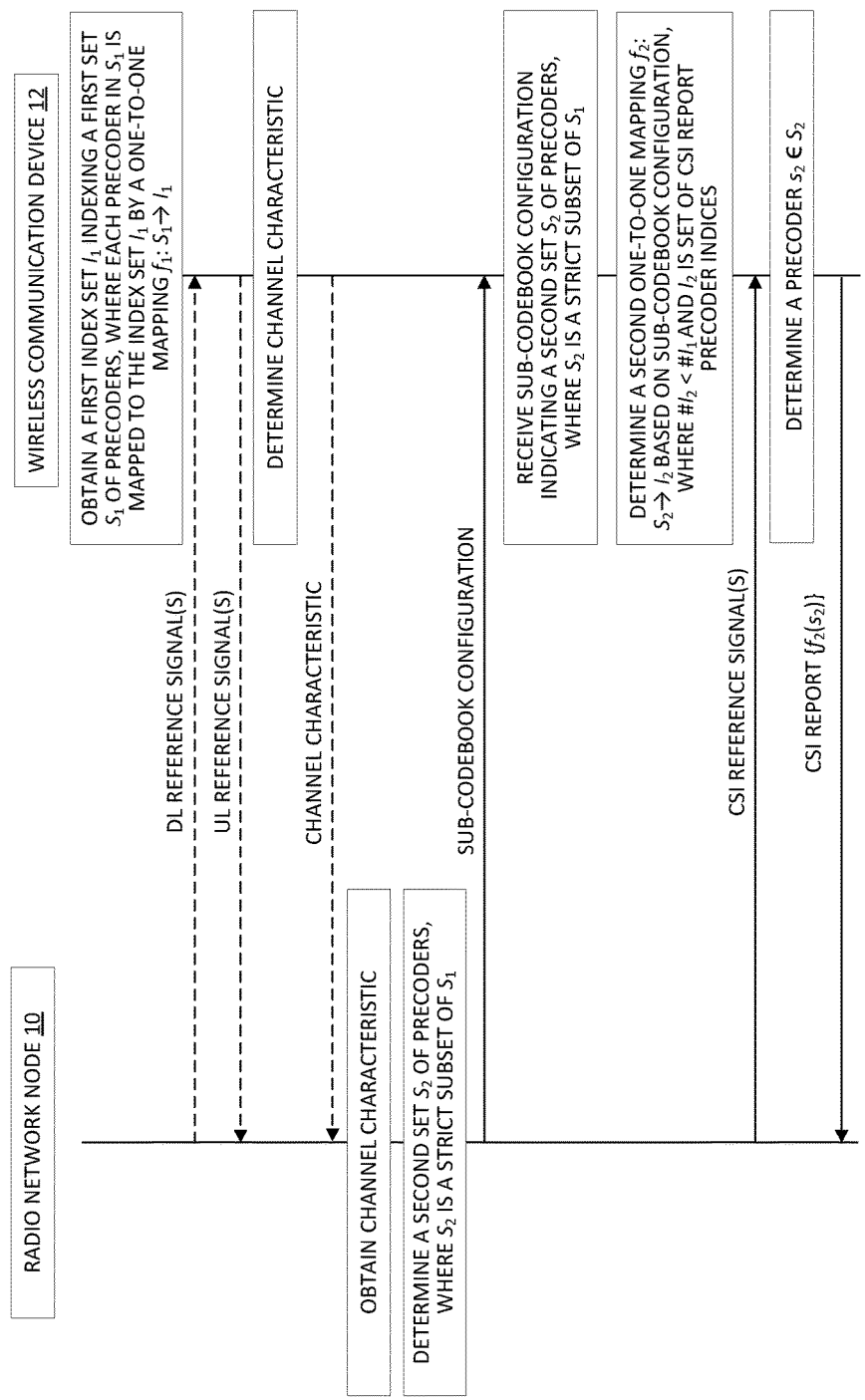
FIGS. 7-11 are signal flow diagrams of various embodiments of signaling and related operations at a radio network node and a wireless device.

Consider the example signal flow illustrated in FIG. 7. The wireless communication device 12 obtains a first index set $I_1$ indexing a first set $S_1$ of precoders and an associated one-to-one mapping $f$ from the first set of pre-coders to indexes in the first index set. In other words, each precoder in the first set $S_1$ is mapped to a corresponding index value in the first set $I_1$ of index values according to a first one-to-one-mapping function expressed as $f_1:S_1 \rightarrow I_1$.

In some embodiments, the wireless communication device 12 receives downlink reference signals from a radio network node 10 and determines one or more channel characteristic properties based on those signals, and transmits one or more indicators of the determined channel characteristic properties. Such transmissions represent one approach to transmitting the channel-characterizing signal described earlier. In other embodiments or at other times, the wireless communication device 12 may transmit, as a channel-characterizing signal, an uplink reference signal or signals, for characterization of the channel between the radio network node 10 and the wireless communication device 12. Both possibilities appear in the diagram.

Whether the channel characteristics are determined in the wireless communication 12 or the radio network node 10, the radio network node 10 in the example signaling flow determines a second set $S_2$ of pre-coders, where the second set is a strict subset of the first set $S_1$. The second or reduced set $S_2$ of precoders reflects current or prevailing channel conditions. That is, the reduced set of precoders is dynamically determined based on a channel characteristic reflecting the most recent characterization of the channel.

In the next steps, the radio network node 10 transmits, and the wireless communication device 12 receives configuration information. The configuration information—denoted as "Sub-codebook configuration" in the diagram—is understood by the wireless communication device 12 as instructing the wireless communication device 12 to consider a smaller set of precoders for CSI reporting purposes. Advantageously, the configuration information from the radio network node 10 instructs the wireless communication device 12 to determine a second one-to-one mapping from the subset $S_2$ of pre-coders to a second index-set $I_2$. The configuration information may indicate the mapping to use, for mapping precoders in the set $S_2$ to respective index values in a second set $I_2$. Alternatively, the wireless communication device 12 may be preconfigured with the defined mapping, or may be configured to derive the mapping. in any case, the wireless communication device 12 determines a second one-to-one mapping function $f_2:S_2 \rightarrow I_2$, where the number of index values in $I_2$ is less than the number of index values in $I_1$, and where its takes fewer bits or less resources to indicate index values in $I_2$ as compared to indicating index values in $I_1$.

Now configured with the desired second set $S_2$ of precoders, the wireless communication device 12 receives further downlink reference signals from the radio network node 10, e.g., "CSI reference signals" to be used for CSI estimation by the wireless communication device 12. The wireless communication device 12 uses the channel estimates determined by it from the CSI reference signals to determine precoder $s_2$ from the second set $S_2$. That is, $s_2 \in S_2$. The wireless communication device 12 correspondingly transmits a CSI report to the radio network node 10, e.g., it transmits a report indicating $\{f_2(s_2)\}$.

Consider an example case where the first set $S_1 = \{s_0, s_1, \ldots, s_{1023}\}$—i.e., the first set $S_1$ of precoders includes 1024 different pre-coders. Thus, a preferred precoder may be indicated from the first set $S_1$ using a bit string of 10 binary values, i.e. using a value from the index-set $I_1 = \{0, 1, \ldots, 1023\}$. This further means that for the wireless communication device 12 to indicate a preferred precoder, the reporting overhead would be 10 bits. However, further in this example, the reduced codebook—i.e., the second set $S_2$ of precoders includes only 32 precoders taken from the larger set $S_1$. In other words, $S_2 = \{s_{i_0}, s_{i_1}, \ldots, s_{i_{31}}\}$, where $i_j \in I_1$. The configuration information from the radio network node 10 in this example instructs the wireless communication device 12 to determine a second mapping $f_2: S_2 \rightarrow I_2$ such as $s_{i_j} \mapsto j$. The second index-set thus equals $I_2 = \{0, 1, \ldots, 31\}$ which can be indicated using 5 bits. Hence, the CSI overhead for reporting preferred pre-coder is reduced from 10 to 5 bits.

Figure 8:
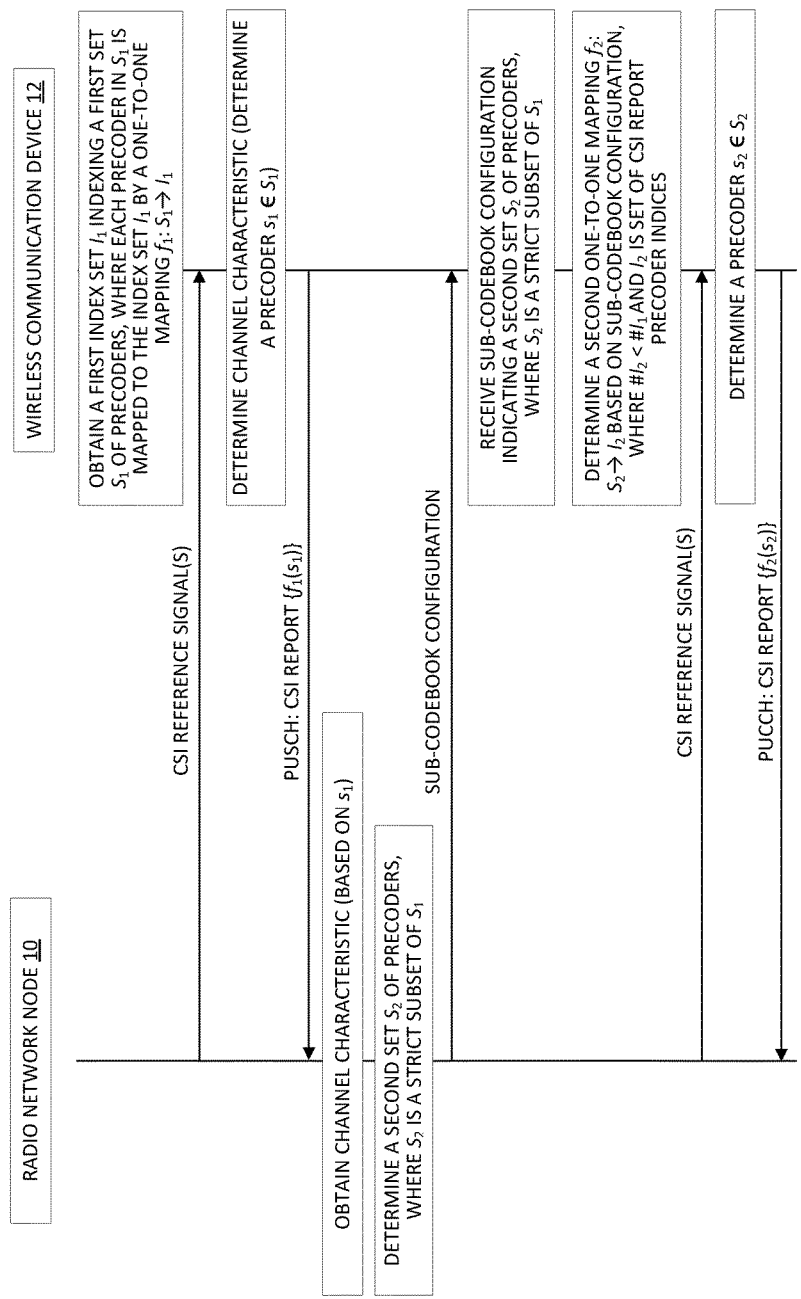

FIG. 8 is similar to FIG. 7, with a few notable distinctions. For example, the wireless communication device 12 sends a CSI report on a Physical Uplink Shared Channel (PUSCH), as a channel-characterizing signal for the radio network node 10. The CSI report includes a precoder indicated from the overall first set $S_1$ of precoders using the first precoder-to-index mapping function—i.e., the CSI report indicates $\{f_1(s_1)\}$. The radio network node 10 uses the reported precoder to determine a reduced set $S_2$ of precoders, which it indicates to the wireless communication device 12 by sending sub-codebook configuration information. As an example of such operations, the radio network node 10 selects a subset of precoders from the full set that have properties matching or similar to those associated with the indicated precoder.

As in FIG. 7, the wireless communication device 12 restricts its subsequent precoder selection operations to the reduced set $S_2$ of precoders. However, FIG. 8 illustrates the advantageous reporting of a precoder selected from the second or reduced set $S_2$ on the Physical Uplink Control Channel (PUCCH). That is, rather than indicating an index value within the numerical space of the first set $I_1$ of index values, the CSI report sent on the PUCCH indicates the selected precoder as $\{f_2(s_2)\}$, where $s_2$ is a selected one of the precoders in the reduced set $S_2$, and is based on the second one-to-one mapping of precoders in the second set $S_2$ to index values in the second set $I_2$ of index values.

Upon reception of the initial or earlier PUSCH-based CSI report, the radio network node 10 obtains channel characteristic properties based on the reported pre-coder. These properties may, for example, be the angular properties and strengths in the beamforming properties of the reported pre-coder. The radio network node 10 then determines the second set $S_2$ (strict subset of the first set) of pre-coders having similar angular properties and strengths in the beamforming properties as the reported pre-coder. The radio network node 10 then transmits a sub-codebook configuration to the wireless communication device 12 instructing the wireless communication device 12 to perform CSI evaluations and report a preferred pre-coder from the second set $S_2$.

As the figure illustrates the wireless communication device 12 reports a preferred precoder from $S_2$ when the CSI report is carried by PUCCH. In some embodiments, the wireless communication device 12 may, when reporting CSI using PUSCH, be configured to report a preferred pre-coder from the set $S_1$ while in other embodiments the reported preferred pre-coder is from the set $S_2$ even when the CSI report is carried by PUSCH. More generally, it may be that in some modes, or for certain times, or for certain channels, the precoder reporting considers the full or overall set $S_1$ of precoders, while in other modes, or at certain other times, or for certain other channels, the precoder reporting considers the reduced set $S_2$ of precoders. It will be understood that the particular precoders included in the reduced set $S_2$ changes dynamically, as a function of channel conditions.

Figure 9:
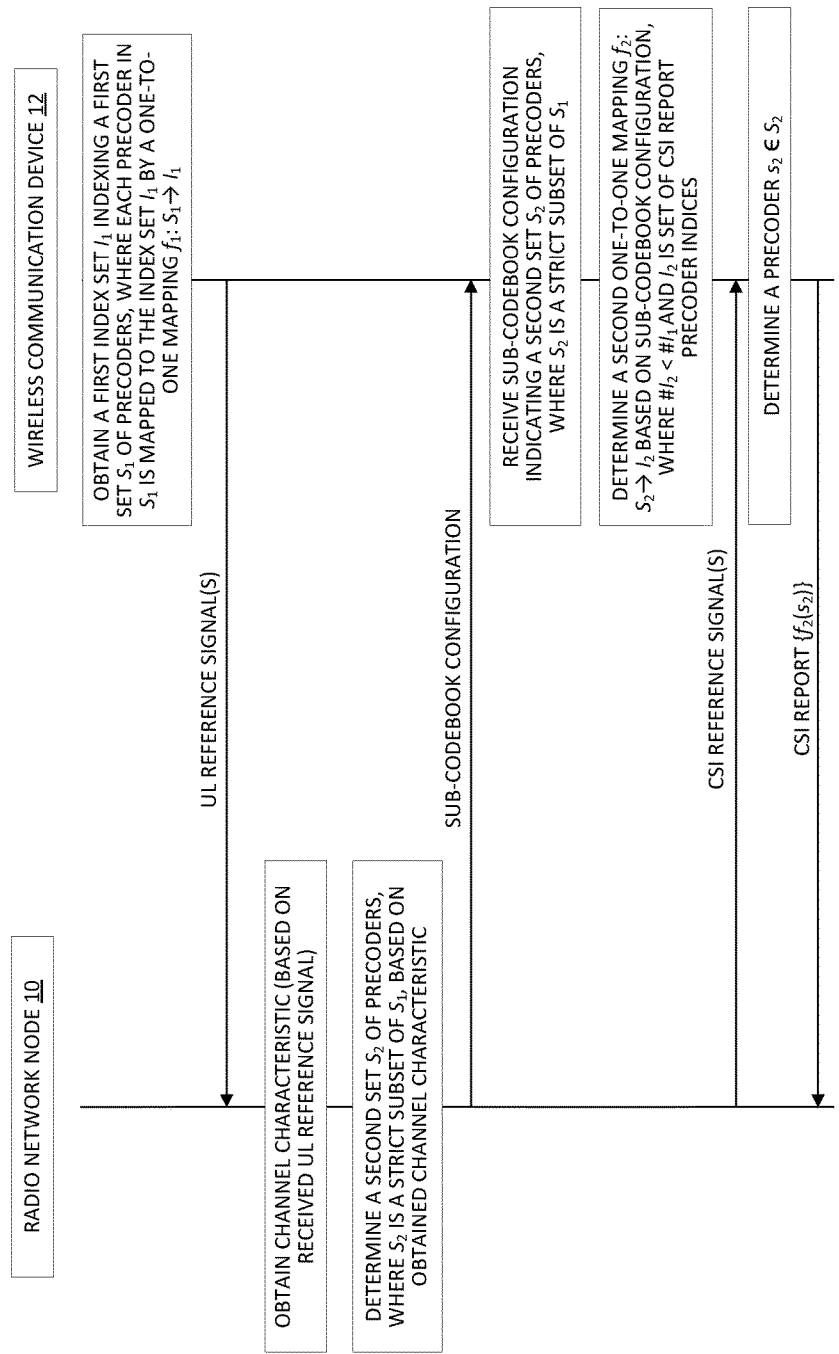

The signaling flow depicted in FIG. 9 is similar to the signaling flows depicted in FIGS. 7 and 8, but is meant to emphasize the possibility of using channel "reciprocity" for estimation of the channel conditions and corresponding determination of the second or reduced set of precoders $S_2$. The radio network node 10 obtains a channel characteristic—which may comprise plural characteristics—for the propagation channel between it and the wireless communication device 12, based on received uplink reference signals transmitted by the wireless communication device 12. In one example, the signals are SRS (Sounding Reference Signals). Although the downlink from the radio network node 10 to the wireless communication device 12 may be on another carrier than then uplink, at least some of the directional properties of the downlink and uplink channels may be correlated. That fact is especially if the wireless communication device 12 is in line-of-sight from the radio network node 10.

Hence, the radio network node 10 may be configured to determine the reduced set $S_2$ of precoders to be considered by the wireless communication device 12 when recommending downlink precoding, by selecting precoders from the set $S_1$ having spatial properties corresponding to those detected by the radio network node 10 on the uplink. The radio network node 10 may for example determine right-singular vectors and singular values of a singular-value decomposition of the uplink channel estimate it determines from the uplink reference signals. The radio network node 10 may then determine the second set $S_2$ of pre-coders such that the pre-coders in $S_2$ have similar beamforming properties as the strongest right-singular vectors.

In a beam-based system, the beams in question may be constructed using Discrete Fourier Transform (DFT) processing. For example, one DFT vector may correspond to the horizontal or azimuthal beam direction, and another DFT vector may correspond to the vertical direction. Kronecker products may be used in this context to construct the pre-coding for a two-dimensional (2D) antenna array. In the same way, many codebooks may be constructed by using a set of DFT vectors (or products for the 2D array case) to construct a pre-coding matrix. Hence when performing the beam selection, a codebook selection can be made by selecting precoding entries containing the one or multiple DFT vectors corresponding to the beam selection. Such operations require a standardization between codebook indices and beam indices to make it possible for the wireless communication device 12 to make the mapping from beam index to a set of precoders. For example, the wireless communication device 12 may be configured to make a beam selection, e.g., pick beam indices $b_0, \ldots, b_n$, and then map the beam indices to a reduced set $S_2$ of codebook entries from a larger set $S_1$.

Figure 10:
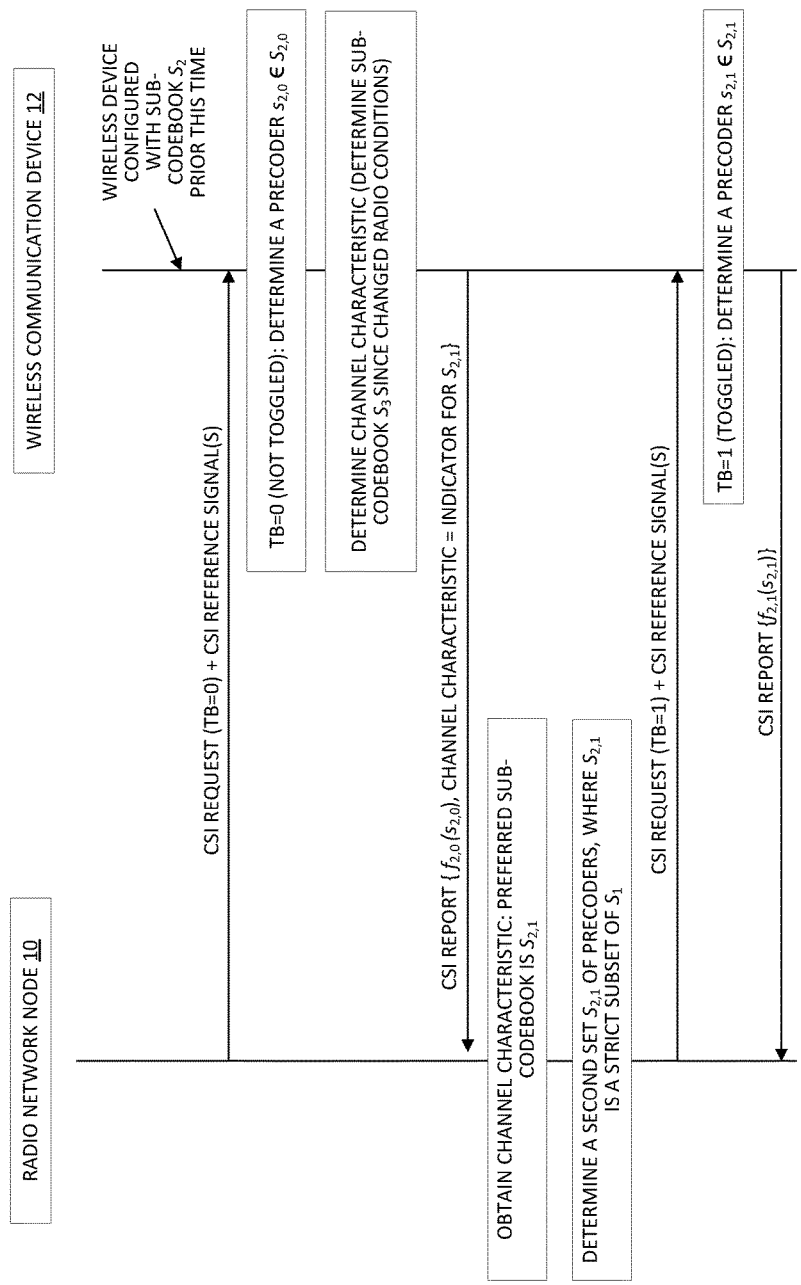
Figure 11:
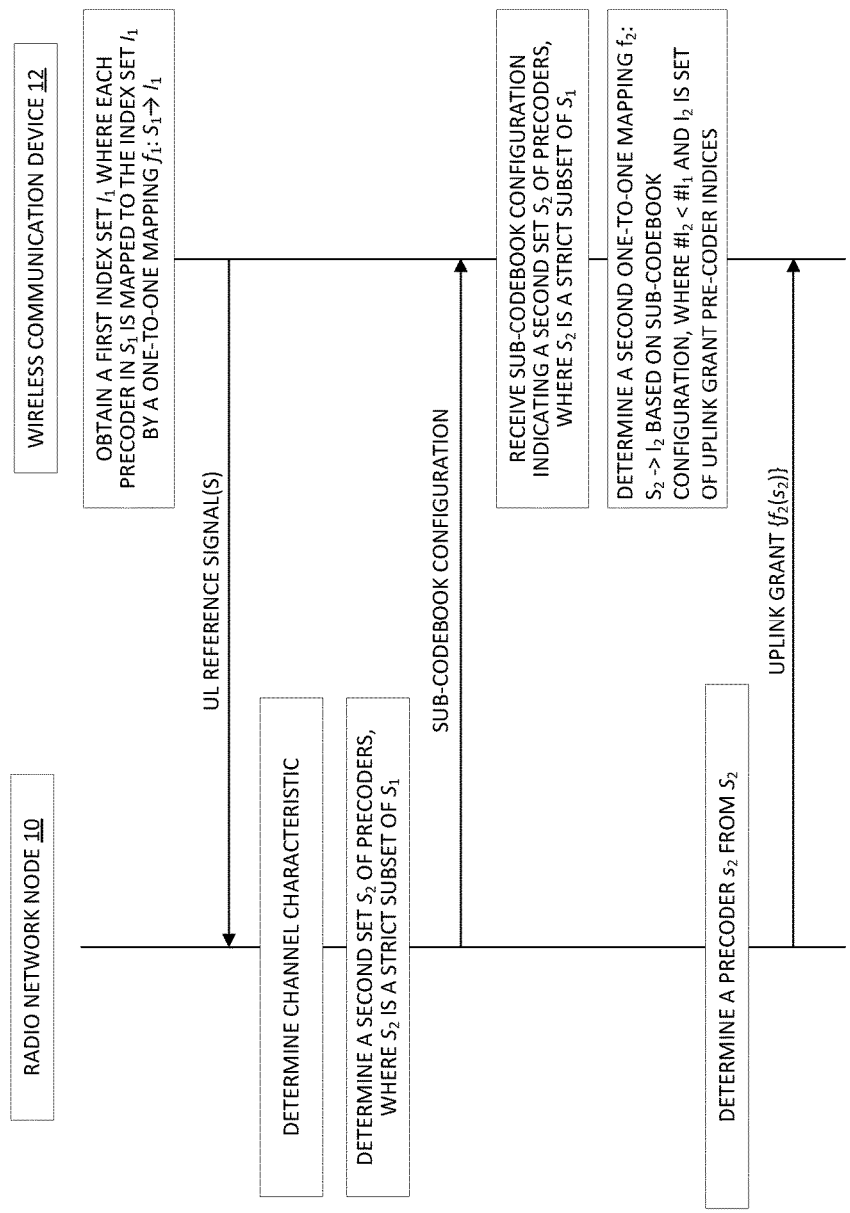

FIG. 10 illustrates an example signaling flow where a toggle bit ("TB") is used. In this embodiment, a set of reduced sets $S_{2,0}, S_{2,1}, \ldots, S_{2,n-1}$ are defined, all being proper subsets of a first set $S_1$ of precoders. The first set $S_1$ of precoders may be defined by specification or using configuration data. Associated with the proper subsets there, are functions $f_{2,0}, f_{2,1}, \ldots, f_{2,n-1}$ defining the one-to-one mapping from precoders $s_{2,i}$ in each second set $S_{2,i}$ to corresponding index values.

The channel characteristic reported by the wireless communication device 12 to the radio network node 10 is an indicator of which of the proper subsets the wireless communication device 12 prefers to use. The channel characteristic may be comprised in a CSI report. Initially, the wireless communication device 12 may obtain (by specification) or be configured (e.g., using RRC) an initial reduced set $S_2$, denoted as $S_{2,0}$. The radio network node 10 transmits downlink control information (DCI) to the wireless communication device 12, e.g., by sending a DCI message over a Physical Downlink Control Channel (PDCCH).

The DCI assigns one or more CSI reference signals to perform CSI measurement on, but the DCI also includes a TB bit. The radio network node 10 toggles the TB (changes its binary value) to acknowledge that the wireless communication device 12 desires to use a new one of the reduced sets $S_{2,i}$ of precoders.

The configuration of reduced codebooks—subsets from a larger codebook—can be performed in several ways. For example, the configuration signaling could be based on Radio Resource Control (RRC) signaling, transmitted in an RRC configuration or reconfiguration message from the radio network node 10 to the wireless communication device 12. The wireless communication device 12 in such embodiments would respond with an RRC configuration (or reconfiguration) complete message. Using such a method for configuration of the sub-codebook configuration has the benefit that the "hand-shake" gives protection against errors in the transmission.

In another embodiment, or in other cases, the configuration information indicating the reduced set(s) of precoders is based on signaling a Medium Access Control (MAC) control element. The MAC-layer approach is faster than the RRC approach because the MAC layer is a lower level in the "layered" network mode—i.e., it resides closer to the physical layer. Faster determination and signaling of the configuration information that defines or indicates the reduced set(s) of precoders to be considered offers the advantage of better tracking changing radio conditions.

In one MAC-layer implementation, the MAC control elements are transmitted over a PDSCH. If PDSCH is not correctly received by the wireless communication device 12, the wireless communication device 12 will transmit an HARQ-ACK=NACK to the radio network node 10. The NACK indicates that the reduced-codebook configuration was not adopted by the wireless communication device 12. Due to radio fluctuations, the HARQ-ACK may be incorrectly received by the radio network node 10. An error case wherein a transmitted HARQ-ACK=ACK is received as an HARQ-ACK=NACK is not severe, because the radio network node 10 may re-transmit the configuration information. However, the opposite error case may be more problematic, but the nature of the signaling is such that the likelihood of mistaking a NACK for an ACK is low.

Another approach relies on MAC control elements and joint uplink and downlink DCI. This solution involves the transmission of the configuration information in a MAC control element comprised in a PDSCH transmission, as described above. However, the "handshake" here the DCI assigning the PDSCH transmission also includes an uplink grant for a PUSCH transmission (e.g., grant for data or UCI such as a CSI report). If the radio network node 10 receives a PUSCH transmission and HARQ-ACK=ACK, radio the network node 10 may assume with high probability that the configuration information it sent to the wireless communication device 12 was properly received. Here, the configuration information is, again, the information indicating one or more reduced sets of precoders to be considered by the wireless communication device 12, instead of considering a full set $S_1$ of precoders.

The reduced set(s) $S_2$ may also be indicated in DCI. In such solutions, an indicator for the reduced-set configuration is comprised in a DCI (UL, DL or joint DL-UL). For example, if the indicator is comprised in the DCI also comprising a grant for a CSI report transmission, then if the radio network node 10 receives the CSI report it knows with high probability that the indicator was correctly received.

Although the above examples involve a wireless communication device 12 reporting precoders as recommendations for use on the downlink from the radio network node 10 to the wireless communication device 12, the teachings herein readily apply to the uplink. In an example of uplink usage, the wireless communication device 12 transmits uplink reference signals to a radio network node 10 which measures on the signals and selects a precoder from a codebook. In a first example of this embodiment, the radio network node 10 sends an uplink grant to the wireless communication device 12 indicating which precoder from the codebook that the wireless communication device 12 should use in its transmission of data to the radio network node 10.

If the codebook is large, the number of bits in the uplink grant needed to indicate which precoder to use will be large. However, according to the teachings herein, the radio network node 10 makes its precoder recommendations from a reduced set of precoders. Consequently, the number of bits in the uplink grant can be decreased significantly.

Figure 12:
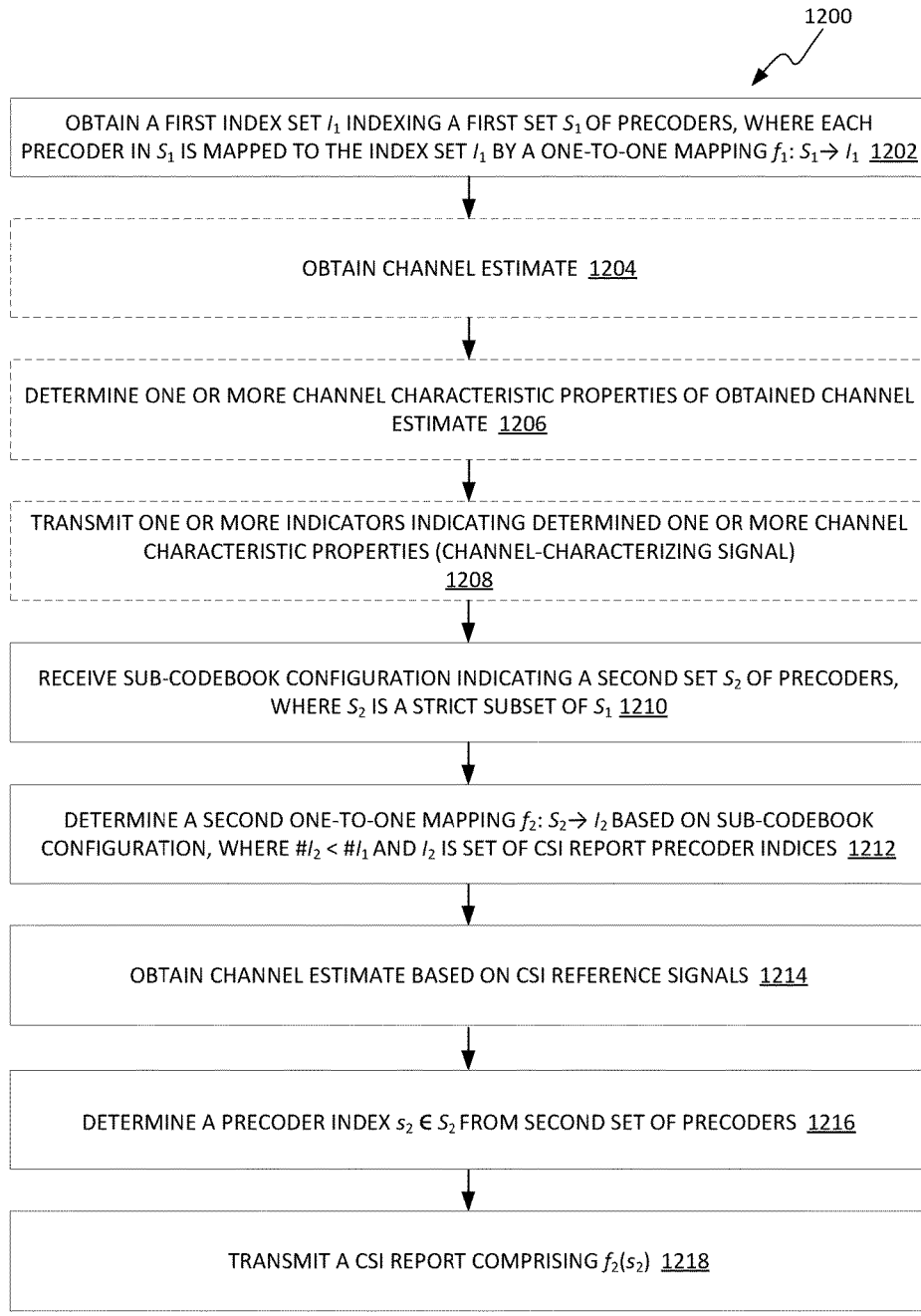
FIG. 12 is a logic flow diagram of another embodiment of a method performed by a wireless communication device operating in a wireless communication network.

FIG. 12 illustrates yet another embodiment involving downlink precoding. According to the method 1200, the wireless communication device 12 obtains (Block 1202) a first index-set $I_1$ indexing a first set $S_1$ and an associated one-to-one mapping $f$ from the set of pre-coders to the index set. The wireless communication device 12 obtains (Block 1204) a channel estimate and uses the channel estimate to characterize the channel (Block 1206)—e.g., to identify one or more parameters or properties characteristic of the channel. Based on having characterized the channel, the wireless communication device 12 transmits a channel-characterizing signal indicating the determined channel characteristic (Block 1208).

A supporting radio network node 10 in the network 16 uses the channel-characterizing signal to select a reduced set of precoders for the wireless communication device 12 to consider, and, in a complementary step (Block 1210), the wireless communication device 12 receives a sub-codebook configuration indicating a second set $S_2$ of pre-coders, where the second set is a strict subset of a first set $S_1$. The sub-codebook configuration instructs the wireless communication device 12 that it shall consider a smaller set of pre-coders when receiving the uplink grant from the network node. The sub-codebook configuration instructs the wireless communication device 12 to determine a second mapping from the subset $S_2$ of pre-coders to a second index-set $I_2$ and, in at least some embodiments, the configuration information defines the mapping to be used.

The wireless communication device 12 obtains a channel estimate (Block 1214), based on receiving CSI reference signals from the radio network node 10, selects (Block 1216) a precoder $s_2$ from the set $S_2$ that it prefers the radio network node 10 to use for transmitting to the wireless communication device 12. The wireless communication device 12 correspondingly transmits (Block 1218) a CSI report to the radio network node 10, comprising $\{f_s(s_2)\}$, e.g., it transmits an index value $i_2$ from the set $I_2$.

In the above description, and elsewhere in the specification, references to items, entities, or components in the singular do not exclude the possibility of plural implementations, unless noted. For example, references to "a processor" are not limited to single-processor implementations and broadly encompass implementations using plural processors operating cooperatively for various ones of the involved functions. Similarly, references to "a node," such as "the radio network node 10", do not exclude multi-node or distributed implementations.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method performed by a wireless communication device configured for operation in a wireless communication network that includes a radio network node, the method comprising:
    transmitting a channel-characterizing signal to the radio network node that indicates a channel characteristic as determined by the wireless communication device, or enables the radio network node to derive the channel characteristic based on the channel-characterizing signal as received at the radio network node, said channel characteristic characterizing a channel between the radio network node and the wireless communication device;
    receiving configuration information from the radio network node, indicating a reduced set of precoders within a full set of precoders are indexed by a full set of index values, the full set of precoders contained in a codebook defined in the wireless communication device and the reduced set of precoders being dynamically determined in dependence on the channel characteristic;
    mapping a reduced set of index values to the reduced set of precoders according to a defined mapping function, the reduced set of index values being smaller than the first set of index values;
    selecting one of the precoders from the reduced set of precoders, in dependence on currently estimated channel conditions between the radio network node and wireless communication device, for use in transmitting from the wireless communication device to the radio network node or from the radio network node to the wireless communication device; and
    transmitting, for the radio network node, an indication of the index value from the reduced set of index values that corresponds to the selected precoder.

2. The method of claim 1, wherein, before transmitting the channel-characterizing signal, the wireless communication device:
    uses a previously indicated reduced subset of precoders within the full set of precoders, said previously indicated subset of precoders being one among a plurality of defined subsets within the full set of precoders; and
    receives a request from the radio network node to transmit the channel-characterizing signal, and
    wherein transmitting the channel-characterizing signal comprises selecting a currently preferred one of the plurality of defined subsets in response to the request and sending an indication of the currently preferred subset to the radio network node.

3. The method of claim 1, wherein transmitting the channel-characterizing signal comprises:
    determining a precoder vector representing phases and/or amplitudes for multi-antenna transmission, as determined by the wireless communication device in dependence on currently estimated channel conditions at the wireless communication device; and
    transmitting an indication of the precoder vector, wherein the precoder vector is not constrained to the full set of precoders.

4. The method of claim 1, wherein transmitting the channel-characterizing signal comprises transmitting an uplink reference signal, the reception of which at the radio network node enables the radio network node to determine the channel characteristic.

5. The method of claim 1, wherein transmitting the channel-characterizing signal comprises transmitting an indication of channel state information, and wherein the method further includes determining the channel state information based on receiving a downlink reference signal transmitted by the radio network node.

6. The method of claim 1, wherein transmitting the channel-characterizing signal comprises reporting a precoder having certain beamforming properties associated with the precoder, thereby enabling the radio network node to determine the reduced set of precoders by identifying the beamforming properties of the reported precoder.

7. The method of claim 1, further comprising determining the defined mapping function from the configuration information, and wherein the defined mapping imposes a one-to-one mapping between index values comprising the reduced set of index values and precoders comprising the reduced set of precoders.

8. The method of claim 1, further comprising choosing between operation in a first precoder selection mode and operation in a second precoder selection mode, wherein the first precoder selection mode considers the full set of precoders and includes selecting and reporting precoders from the full set of precoders, and wherein the second precoder selection mode considers the reduced set of precoders and includes selecting and reporting precoders from the reduced set of precoders according to said steps of mapping, selecting, and transmitting.

9. The method of claim 8, further comprising choosing between the first precoder selection mode and the second precoder selection mode in dependence on at least one of: control signaling from the radio network node and a type of transmission being used for reporting precoder selections, wherein different types of transmissions are associated with different signaling overheads, and wherein reporting precoder selections using the reduced set of index values involves a lower signaling overhead in comparison to reporting precoder selections using the full set of index values.

10. A wireless communication device configured for operation in a wireless communication network that includes a radio network node, the wireless communication device comprising:
communication circuitry configured for transmitting signals to and receiving signals from the radio network node; and
processing circuitry operatively associated with the communication circuitry and configured to:
transmit a channel-characterizing signal to the radio network node that indicates a channel characteristic as determined by the wireless communication device, or enables the radio network node to derive the channel characteristic based on the channel-characterizing signal as received at the radio network node, said channel characteristic characterizing a channel between the radio network node and the wireless communication device;
receive configuration information from the radio network node, indicating a reduced set of precoders within a full set of precoders are indexed by a full set of index values, the full set of precoders contained in a codebook defined in the wireless communication device and the reduced set of precoders being dynamically determined in dependence on the channel characteristic;
map a reduced set of index values to the reduced set of precoders according to a defined mapping function, the reduced set of index values being smaller than the first set of index values;
select one of the precoders from the reduced set of precoders, in dependence on currently estimated channel conditions between the radio network node and wireless communication device, for use in transmitting from the wireless communication device to the radio network node or from the radio network node to the wireless communication device; and
transmit, for the radio network node, an indication of the index value from the reduced set of index values that corresponds to the selected precoder.

11. The wireless communication device of claim 10, wherein the processing circuitry is configured to, before transmitting the channel-characterizing signal:
use a previously indicated reduced subset of precoders within the full set of precoders, said previously indicated subset of precoders being one among a plurality of defined subsets within the full set of precoders; and
receive a request from the radio network node to transmit the channel-characterizing signal, and
wherein the processing circuitry is configured to transmit the channel-characterizing signal by selecting a currently preferred one of the plurality of defined subsets in response to the request and sending an indication of the currently preferred subset to the radio network node.

12. The wireless communication device of claim 10, wherein the processing circuitry is configured to transmit the channel-characterizing signal by:
determining a precoder vector representing phases and/or amplitudes for multi-antenna transmission, as determined by the wireless communication device in dependence on currently estimated channel conditions at the wireless communication device; and
transmitting an indication of the precoder vector, and wherein the precoder vector is not constrained to the full set of precoders.

13. The wireless communication device of claim 10, wherein the processing circuitry is configured to transmit the channel-characterizing signal by transmitting an uplink reference signal, the reception of which at the radio network node enables the radio network node to determine the channel characteristic.

14. The wireless communication device of claim 10, wherein the processing circuitry is configured to:
transmit the channel-characterizing signal by transmitting an indication of channel state information; and
determine the channel state information based on receiving a downlink reference signal transmitted by the radio network node.

15. The wireless communication device of claim 10, wherein the processing circuitry is configured to transmit the channel-characterizing signal by reporting a precoder having certain beamforming properties associated with the precoder, thereby enabling the radio network node to determine the reduced set of precoders by identifying the beamforming properties of the reported precoder.

16. The wireless communication device of claim 10, wherein the processing circuitry is configured to determine the defined mapping function from the configuration information, and wherein the defined mapping imposes a one-to-one mapping between index values comprising the reduced set of index values and precoders comprising the reduced set of precoders.

17. The wireless communication device of claim 10, wherein the processing circuitry is configured to choose between operation in a first precoder selection mode and operation in a second precoder selection mode, wherein the first precoder selection mode considers the full set of precoders and includes selecting and reporting precoders from the full set of precoders, and wherein the second precoder selection mode considers the reduced set of precoders and includes selecting and reporting precoders from the reduced set of precoders according to the map, select, and transmit operations set forth in claim 10.

18. The wireless communication device of claim 17, wherein the processing circuitry is configured to choose between the first precoder selection mode and the second precoder selection mode in dependence on at least one of: control signaling from the radio network node and a type of transmission being used for reporting precoder selections, wherein different types of transmissions are associated with different signaling overheads, and wherein reporting precoder selections using the reduced set of index values involves a lower signaling overhead in comparison to reporting precoder selections using the full set of index values.

19. A method performed by a radio network node configured for operation in a wireless communication network, the method comprising:
controlling, at least at certain times or under certain conditions, precoder selection by a wireless communication device operating in the wireless communication network, said controlling comprising:
receiving a channel-characterizing signal from the wireless communication device;
determining, from the channel-characterizing signal, channel state information for a propagation channel between the radio network node and the wireless communication device;
selecting, in consideration of the channel state information, a reduced set of precoders within a full set of precoders that are indexed by a full set of index values, the full set of precoders being contained in a codebook defined in the radio network node;

generating configuration information indicating the reduced set of precoders, wherein precoders within the reduced set of precoders are defined by respective index values in a reduced set of index values that is smaller than the full set of index values and mapped to the reduced set of precoders according to a defined mapping function;

transmitting the configuration information to the wireless communication device, to thereby enable the wireless communication device to perform precoder selection with respect to the reduced set of precoders, rather than the full set of precoders, at least at certain times or under certain conditions; and receiving one or more precoder selection indications from the wireless communication device, the one or more precoder selection indications being limited to indicating precoders in the reduced set of precoders and comprising or corresponding to corresponding index values from the reduced set of index values.

20. The method of claim 19, wherein receiving the channel-characterizing signal comprises receiving the channel-characterizing signal at multiple reception instances, said multiple reception instances reflecting changing propagation channel conditions, and wherein said controlling comprises performing a dynamic process responsive to the changing propagation channel conditions, such that the radio network node updates its selection of the reduced set of precoders responsive to the changing propagation channel conditions, and correspondingly updates the configuration information for transmission to the wireless communication device.

21. The method of claim 20, further comprising operating with a plurality of defined reduced sets of precoders, wherein selecting the reduced set of precoders comprises selecting one of the plurality of defined reduced sets of precoders, and wherein generating the configuration information comprises including a set indicator in the configuration information that corresponds to the selected defined reduced set of precoders.

22. The method of claim 19, wherein receiving the channel-characterizing signal comprises receiving an uplink reference signal and determining the channel state information based on the uplink reference signal as received at the radio network node.

23. The method of claim 19, wherein the channel-characterizing signal includes the channel state information, and wherein determining the channel state information comprises obtaining the channel state information from the channel-characterizing signal.

24. The method of claim 19, wherein the channel-characterizing signal is a reported precoder having certain beamforming properties associated with the precoder, and wherein determining the channel state information comprises identifying the beamforming properties of the reported precoder.

25. The method of claim 19, further comprising indicating the defined mapping function in the configuration information for use by the wireless communication device, wherein the defined mapping imposes a one-to-one mapping between index values comprising the reduced set of index values and precoders comprising the reduced set of precoders.

26. The method of claim 19, wherein the certain times or the certain conditions comprise operation in a second mode where the wireless communication device operates with the reduced set of precoders and reports precoder selections from the reduced set of precoders using the reduced set of index values, and wherein the method further comprises selecting between the second mode of operation and a first mode of operation where the wireless communication device operates with the full set of precoders and reports precoder selections from the full set of precoders using the full set of index values.

27. The method of claim 26, further comprising choosing between the first mode and the second mode in dependence on at least one of: scheduling considerations at the radio network node involving a plurality of wireless communication devices, and a type of transmission being used by the wireless communication device for reporting precoder selections, wherein different types of transmissions are associated with different signaling overheads, and wherein reporting precoder selections using the reduced set of index values involves a lower signaling overhead in comparison to reporting precoder selections using the full set of index values.

28. A radio network node configured for operation in a wireless communication network, the radio network node comprising:

communication circuitry configured for transmitting signals to and receiving signals from wireless communication devices operating in the wireless communication network; and processing circuitry operatively associated with the communication circuitry and configured to control, at least at certain times or under certain conditions, precoder selection by a wireless communication device operating in the wireless communication network, based on being configured to:

receive a channel-characterizing signal from the wireless communication device;

determine, from the channel-characterizing signal, channel state information for a propagation channel between the radio network node and the wireless communication device;

select, in consideration of the channel state information, a reduced set of precoders within a full set of precoders that are indexed by a full set of index values, the full set of precoders being contained in a codebook defined in the radio network node;

generate configuration information indicating the reduced set of precoders, wherein precoders within the reduced set of precoders are defined by respective index values in a reduced set of index values that is smaller than the full set of index values and mapped to the reduced set of precoders according to a defined mapping function;

transmit the configuration information to the wireless communication device, to thereby enable the wireless communication device to perform precoder selection with respect to the reduced set of precoders, rather than the full set of precoders, at least at certain times or under certain conditions; and receive one or more precoder selection indications from the wireless communication device, the one or more precoder selection indications being limited to indicating precoders in the reduced set of precoders and comprising or corresponding to corresponding index values from the reduced set of index values.

29. The radio network node of claim 28, wherein the processing circuitry is configured to:

receive the channel-characterizing signal at multiple reception instances, said multiple reception instances reflecting changing propagation channel conditions; and control precoder selection by the wireless communication device by performing a dynamic process responsive to the changing propagation channel conditions, such that the radio network node updates its selection of the reduced set of precoders responsive to the changing propagation channel conditions, and correspondingly updates the configuration information for transmission to the wireless communication device.

30. The radio network node of claim 29, wherein the processing circuitry is configured to:
  operate with a plurality of defined reduced sets of precoders;
  select the reduced set of precoders by selecting one of the plurality of defined reduced sets of precoders; and
  generate the configuration information to include a set indicator that corresponds to the selected defined reduced set of precoders.

31. The radio network node of claim 28, wherein the processing circuitry is configured to:
  receive an uplink reference signal as the channel-characterizing signal; and
  determine the channel state information based on the uplink reference signal as received at the radio network node.

32. The radio network node of claim 28, wherein the channel-characterizing signal includes the channel state information, and wherein the processing circuitry is configured to determine the channel state information by obtaining the channel state information from the channel-characterizing signal.

33. The radio network node of claim 28, wherein the channel-characterizing signal is a reported precoder having certain beamforming properties associated with the precoder, and wherein the processing circuitry is configured to determine the channel state information by identifying the beamforming properties of the reported precoder.

34. The radio network node of claim 28, wherein the processing circuitry is configured to indicate the defined mapping function in the configuration information for use by the wireless communication device, wherein the defined mapping imposes a one-to-one mapping between index values comprising the reduced set of index values and precoders comprising the reduced set of precoders.

35. The radio network node of claim 28, wherein the certain times or the certain conditions comprise operation in a second mode where the wireless communication device operates with the reduced set of precoders and reports precoder selections from the reduced set of precoders using the reduced set of index values, and wherein the processing circuitry is configured to select between the second mode of operation and a first mode of operation where the wireless communication device operates with the full set of precoders and reports precoder selections from the full set of precoders using the full set of index values.

36. The radio network node of claim 35, wherein the processing circuitry is configured to choose between the first mode and the second mode in dependence on at least one of: scheduling considerations at the radio network node involving a plurality of wireless communication devices, and a type of transmission being used by the wireless communication device for reporting precoder selections, wherein different types of transmissions are associated with different signaling overheads, and wherein reporting precoder selections using the reduced set of index values involves a lower signaling overhead in comparison to reporting precoder selections using the full set of index values.

* * * * *